United States Patent [19]
Shioiri et al.

[11] Patent Number: 5,641,523
[45] Date of Patent: Jun. 24, 1997

[54] PROTECTING DEVICE OF AN INJECTION MOLDING MACHINE

[75] Inventors: Takayoshi Shioiri; Tsuyoshi Arai; Toshiyasu Koda, all of Nagano, Japan

[73] Assignee: Nissei Plastic Industrial Co., Ltd., Nagano-ken, Japan

[21] Appl. No.: 501,646

[22] Filed: Jul. 12, 1995

[30] Foreign Application Priority Data

Jul. 20, 1994 [JP] Japan .................... 6-190983
Jul. 20, 1994 [JP] Japan .................... 6-190984

[51] Int. Cl.$^6$ .................................... B29C 45/76
[52] U.S. Cl. ............................ 425/136; 425/145
[58] Field of Search ........................ 425/136, 138, 425/137, 145

[56] References Cited

U.S. PATENT DOCUMENTS 5,445,773  8/1995  Arai .......................... 425/136

FOREIGN PATENT DOCUMENTS 5-50483  3/1993  Japan .

Primary Examiner—Tim Heitbrink

[57] ABSTRACT

A protecting apparatus of an injection molding machine having an injection of cylinder 2r with a built-in double rod type piston, and a servo valve for driving and controlling the injection cylinder includes a power failure detecting circuit for detecting a power failure, and a power-failure-time signal outputting circuit Ub for outputting a neutral signal, by which the servo valve is controlled at a neutral signal, by which the servo valve is controlled at a neutral position, to an instruction signal input line for the servo valve, due to the detection of the power failure by the power failure detecting circuit. A power-failure-time shutting down circuit is connection to the oil transferring line for supplying pressurized oil to the injection cylinder. The power-failure-time shutting down circuit includes a control valve for opening the oil transferring at the time of the non-power failure, and for shutting down the oil transferring line at the time of the power failure. Thereby, even if the power failure occurs in the state when the purging cover is closed at a time of positional control in the unguarded state a problem where the resin is ejected at high speed can be presented.

10 Claims, 5 Drawing Sheets

FIG.1
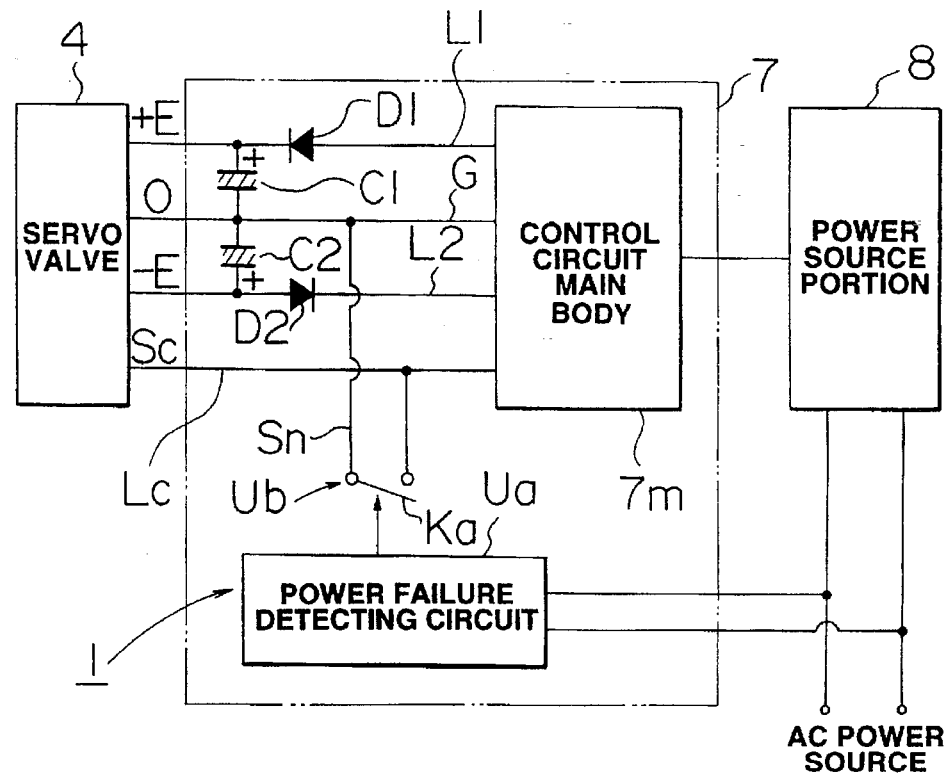
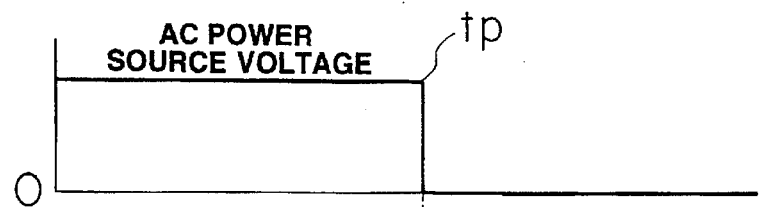
FIG.2(A)
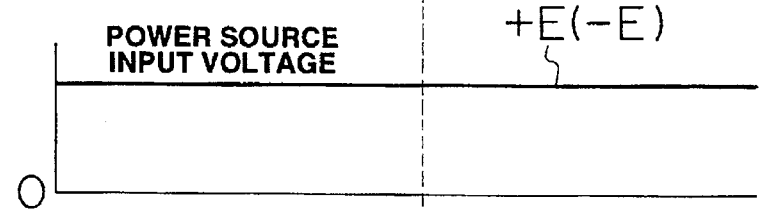
FIG.2(B)
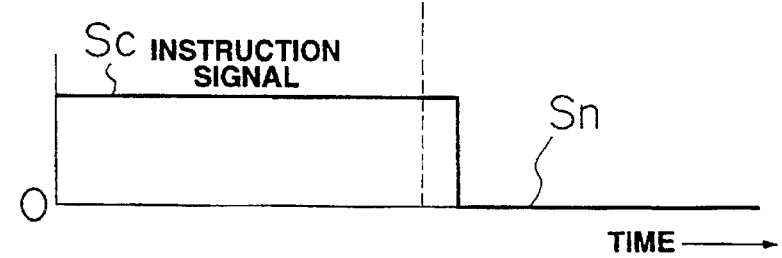
FIG.2(C)

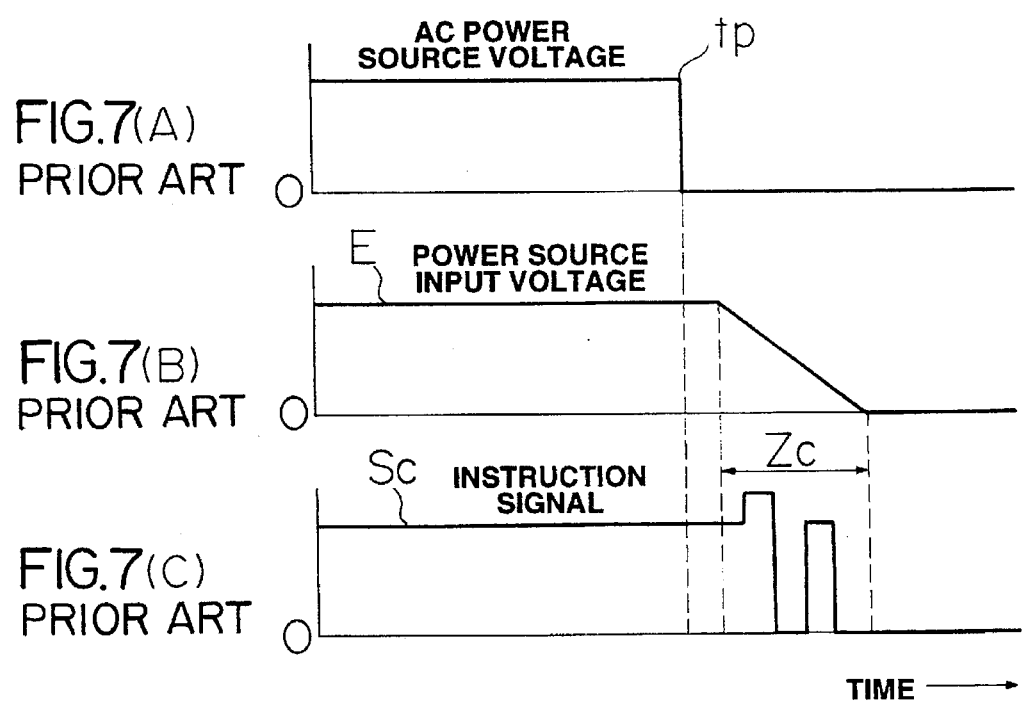

PROTECTING DEVICE OF AN INJECTION MOLDING MACHINE

BACKGROUND OF THE INVENTION

1. Field of the Invention

The present invention relates to a protecting device of an injection molding machine provided with a hydraulic cylinder having a built-in double-rod type piston and a servo valve for driving and controlling the hydraulic cylinder.

2. Description of the Relevant Art

Up to now, there is known an injection molding machine provided with an injection cylinder having a built-in double-rod type piston and a servo valve for driving and controlling the cylinder, in the official gazette of Japanese Patent Laid-Open No. 5(1993)-50483.

FIG. 6 shows a schematic construction of this kind of injection molding machine. In the same drawing, the injection molding machine 50 is provided with an injection apparatus 51 and a mold clamping apparatus 52. The injection apparatus 51 is provided with a barrel cylinder 54 having a built-in screw 53. The barrel cylinder 54 has an injection nozzle 55 at a fore end thereof and a hopper 56 for supplying a material to be molded, at a rear end thereof. Also, on the rear end of the barrel cylinder 54 is disposed an injection cylinder 57 for driving the screw 53 in a fore and rear direction thereof. The injection cylinder 57 has a built-in double-rod type piston 58, and a rear end of the screw 53 is connected to a fore end of the piston 58. Further, an oil motor 59 is disposed on a rear end of the injection cylinder 57, and a rotational shaft 60 of the oil motor 59 is spline-connected to a rear end of the piston 58. A fore oil chamber and a rear oil chamber of the injection cylinder 57 are connected to a pressurized oil supplying portion 62 and an oil tank 63 through a four-port servo valve 61. Moreover, the pressurized oil supplying portion 62 includes a load/unload changing valve 65 of a hydraulic pump 64, a non-return valve 66 and an accumulator 67. Reference numeral 68 denotes a control circuit for controlling a servo valve 61, and the control circuit 68 is fed with electricity from a power source portion 69.

The injection molding machine 50 is provided with the injection cylinder 57 having the built-in double-rod type piston 58, and also drives and controls the injection cylinder 57 by means of the servo valve 61, so that positional control (stopping control) of the screw 53 is easily carried out.

Sometimes the injection and charging is intended to be completed in a short time in order to hinder the progress of solidification before the completion of the injection and charging. Usually, the accumulator 67 is connected to the side of the pressurized oil supplying portion 62 and the servo valve 61 is made large-sized, so that the injection speed is high.

However, in a case where the positional control is carried out for the screw 53 in the injection molding machine 50 which is made high speed, even if the piston 58 is stopped, hydraulic pressure is always applied to the fore oil chamber and the rear oil chamber in the injection cylinder 57. Accordingly, in a case where a power failure is caused, and then a voltage of an AC power source is decreased to 0 volts at a tp point shown in FIG. 7(A), a power source input voltage E (+E, −E) of the control circuit 68 is not decreased instantaneously as shown in FIG. 7(B), and based on which, an instruction signal Sc given to the servo valve 61 turns out to be in an unstable uncontrolled state in a period Zc shown in FIG. 7(C). This unstable period Zc is a short time.

However, in case of a high speed injection molding machine, the injection is completed at about 0.1 second, so there is a problem that the resin is ejected out of the injection nozzle 55 in a little time at a time of the power failure. Moreover, the operation of the screw 53 is interlocked by means of a purging cover in order to prevent the resin from scattering in a normal high speed injection, so that the screw 53 cannot be advanced without closing the purging cover. However, such a protection countermeasure is ignored in the uncontrolled state, and then the resin is ejected in an unguarded state.

SUMMARY OF THE INVENTION

It is an object of the present invention to provide a protecting apparatus of an injection molding machine which can solve the problem that an instruction signal becomes unstable at a time of a power failure and a resin is ejected at a high speed in an unguarded state.

The present invention included an injection molding machine M comprising a hydraulic cylinder 2, for example an injection cylinder 2i having a built-in double rod type piston 3, and a servo valve 4 for driving and controlling the injection cylinder 2i. A power failure detecting circuit Ua is provided for detecting a power failure, and a power-failure-time signal outputting circuit Ub is provided for outputting a neutral signal Sn by which the servo valve 4 is controlled at a neutral position, to an instruction signal input line Lc for the servo valve 4, due to the detection of the power failure by the power failure detecting circuit Ua.

The power-failure-time signal outputting circuit Ub can be constructed by an opening/closing switch Ka connected between the instruction signal input line Lc and the earth line G, which is closed when the power failure is detected by the power failure detecting circuit Ua. Further, it is desirable that the condenser C1 for accumulating the electricity is connected between the power source input line L1 of the servo valve 4 and the earth line G.

The power-failure-time shutting down circuit 5 is connected to the oil transferring line L for supplying the pressurized oil to the injection cylinder 2i. The power-failure-time shutting down circuit 5 includes a control valve 6 for opening the oil transferring line L at the time of the non-power failure, and for shutting down the oil transferring line L at the time of the power failure.

On this occasion, the control valve 6 opens the oil transferring line L by electrification from the power source portion 8 for feeding the electricity to a control circuit 7 for controlling the servo valve 4, and shutting down the oil transferring line by means of stopping the electrification. Also, it is desirable that a flow reducing circuit 10 be connected to the piston 3 for reducing a flow of the pressurized oil at the time of the positional control of the screw 9.

Since the power failure detecting circuit Ua does not detect the power failure in the normal state of the non-power failure, the opening/closing switch Ka in the power-failure-time signal outputting circuit Ub is in the open state. Accordingly, the instruction signal input line Lc turns out to be in the non-contact state to the earth line G, so that the instruction signal Sc is applied to the servo valve 4 as it is, from the control circuit 7. Also, the control valve 6 is electrified from the power source portion 8, so that the control valve 6 is changed and then the power-failure-time shutting down circuit 5 becomes a turn-on state. As a result, the oil transferring line L is opened, while the servo valve 4 can be controlled by the instruction signal Sc outputted from the control circuit 7, there is carried out a normal control in which the injection cylinder 2i is driven and controlled.

On the other hand, in a case where the power failure is caused, the power failure is detected by the power failure detecting circuit Ua. Thereby, a neutral signal Sn for controlling the servo valve 4 at a neutral position is applied to the instruction signal input line Lc of the servo valve 4 from the power failure time signal outputting circuit Ub. That is, the opening/closing switch Ka is closed, so that the instruction signal input line Lc and the earth line G are connected to each other, and a zero potential is applied to the instruction signal input line Lc. Thereby, the servo valve 4 is fixed to the neutral position, and the problem that the instruction signal Sc becomes unstable due to the occurrence of the power failure can be eliminated.

Also, since the condensers C1, C2 for accumulating the electricity are connected between the electric source input lines L1, L2 of the servo valve 4 and the earth line G, even if the power failure occurs, the electric source input lines L1, L2 of the servo valve 4 are applied with the essential electric power input voltage +E, −E, respectively, during a constant time period, so that the instruction signal Sc can be stabilized from viewpoint of the electric power input voltage to the servo valve 4.

Further, since the electrification from the power source 8 to the control valve 6 is stopped, the control valve 6 is changed so that the oil transferring line L is shut by the power-failure-time shutting down circuit 5, and then the supply of pressurized oil to the injection cylinder 2i is stopped. On this occasion, since the control valve 6 is electrified from a side of the power source portion 8, the supply of pressurized oil to the injection cylinder 2i is stopped before the control circuit 7 for controlling the servo valve 4 is in the non-control state. Incidentally, the flow at the time of the positional control can be decreased by disposing the flow reducing circuit 10 on the oil transferring line L, and closing speed can be improved at the time when the power failure occurs, and at the time of the positional control.

Accordingly, even if a power failure occurs when the purging cover is closed at the time of the positional control, that is, in the unguarded state, the problem that the resin is ejected at the high speed is not caused.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not, limitative of the present invention, and wherein:

FIG. 1 is a view of an electric circuit of an protecting apparatus according to the present invention;

FIGS. 2A–2C are timing charts of voltage waveforms at respective portions of the same protecting apparatus;

FIGS. 7A–7C are timing charts of voltage waveforms at respective portions of the injection molding machine shown in FIG. 6.

DETAILED DESCRIPTION OF THE PREFERRED EMBODIMENT

Figure 3:
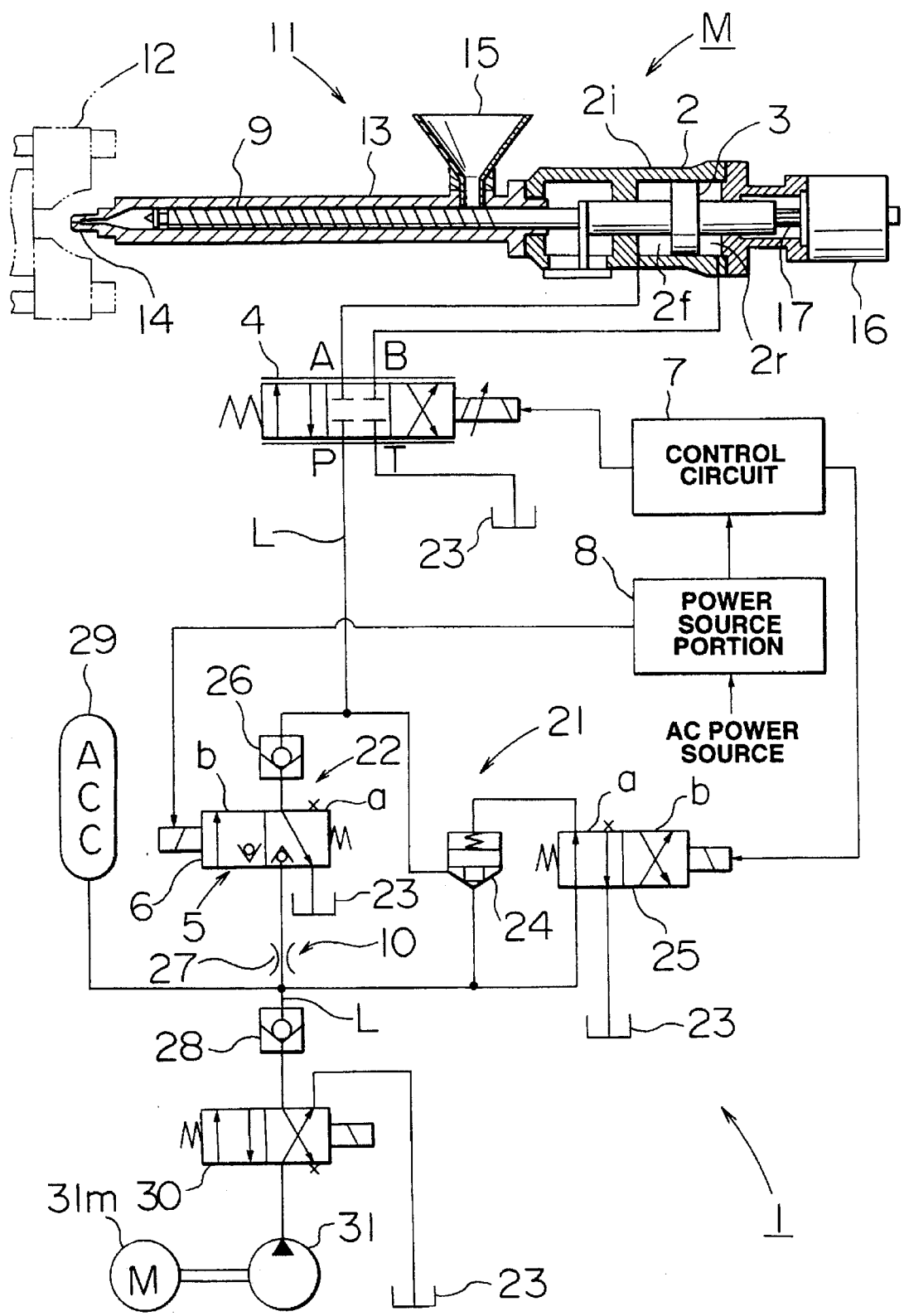
FIG. 3 is a view of an injection machine including the protecting apparatus according to the present invention.

The preferred embodiment according to the present invention will be explained with reference to the drawings.

First, an injection machine M including a protecting apparatus 1 will be explained with reference to FIG. 3.

In the same drawing, the injection molding machine M is provided with an injection apparatus 11 and a mold clamping apparatus 12. The injection apparatus 11 is provided with a barrel cylinder 13 having a built-in screw 9. An injection nozzle 14 is disposed on a fore end of the barrel cylinder 13, and a hopper 15 for supplying a material to be molded is disposed on a rear end of the barrel cylinder 13. Also, an injection cylinder 2i for driving the screw 9 in a fore and rear direction is disposed on the rear end of the barrel cylinder 13. The injection cylinder 2i has a built-in double rod type piston 3, and a rear end of the screw 9 is connected to a fore end of the injection cylinder 2i. However, an oil motor 16 is disposed on a rear end of the injection cylinder 2i, and a rotational shaft 17 of the oil motor 16 is spline-connected to a rear end of the piston 3.

A fore oil chamber 2f and a rear oil chamber 2r of the injection cylinder 2i are connected to an A port and a B port of a four-port servo valve 4. Also, a P port of the servo valve 4 is connected to an outflow side of a parallel circuit of a large flow circuit 21, constituting one portion of the protecting apparatus 1 according to this embodiment and a small flow circuit 22, through an oil transferring line L. A T port of the servo valve 4 is connected to an oil tank 23.

The large flow circuit 21 is provided with a logic valve 24 and a control valve 25 for controlling the logic valve 24. In a case where the control valve 25 is changed over to a position shown by reference symbol a, the logic valve 24 is closed, so that the large flow circuit 21 is shut down. In a case where the control valve 25 is changed over to a position shown by reference symbol b, the logic valve 24 is opened, so that the small flow circuit 22 is in a flow allowing state.

The small flow circuit 22 includes a non-return valve 26, a control valve 6 constituting a power-failure-time shutting down circuit 5, and a throttle valve 27, which are connected with each other in series. Thereby, in a case where the control valve 6 is changed over to a position shown by reference symbol a, the small flow circuit 22 is shut down. In a case where the control valve 6 is changed over to a position shown by reference symbol b, the small flow circuit 22 is in a flow allowing state. In this case, the control valve 6 is selected to have a built-in non-return valve and which prevents leakage when closed. Also, the control valve 6 is changed over to the position shown by reference symbol b by electrifying, and changed over to the position shown by reference symbol a by a return spring when the electrifying is stopped. Further, the throttle valve 27 constitutes a flow reducing circuit 10 for reducing the flow.

An inflow side of the parallel circuit of the large flow circuit 21 and the small flow circuit 22 are connected to an outflow side of the non-return valve 28 and the accumulator 29 through an oil transferring line L, respectively. An outflow side of the non-return valve 28 is connected to a hydraulic pump 31 through a load/unload changing over valve 30. Incidentally, reference numeral 31m denotes a pump motor 31m.

Reference numeral 7 denotes a control circuit, which has a function of controlling the servo valve 4 and the control valve 25. Also, the control circuit 7 has a built-in protecting apparatus 1 according to this embodiment.

Next, the construction of the protecting apparatus 1 will be described with reference to FIG. 1. The control circuit 7 is provided with a control circuit main body 7m. The servo valve 4 is connected to the control circuit main body 7m through four signal lines, that is, a positive side power source input line L1, a negative side power source input line L2, the earth line G and the instruction signal input line Lc. In this case, the diodes D1 and D2 are connected in the positive side power source input line L1 and the negative side power source input line L2, respectively. Electric accumulating condensers C1, C2 which have a large capacitance, for example, an electrolytic condenser, are connected between the earth line G and the power source input lines L1, L2, respectively, of the servo valve 4.

A power failure detecting circuit Ua for detecting the power failure is connected to the AC power source (commercial alternating current) at an input side thereof, and detects the power failure based on a reduction of the voltage due to the power failure and outputs the result of the detection thereof. Also, an opening/closing switch Ka constituting a power-failure-time signal outputting circuit Ub is connected between the instruction signal input line Lc and the earth line G. The opening/closing switch Ka is open at a time of a non-power failure, and closes when the power failure detecting circuit Ua detects the power failure, thereby connecting the instruction signal input line Lc to the earth line G.

Reference numeral 8 denotes a power source to which an AC power source is inputted. The power source 8 feeds electricity to the control circuit 7 and also electrifies the control valve 6 as shown in FIG. 3. In this case, it is desirable that the electrification to the control valve 6 is applied with a potential in a side of the AC power source of the power source 8 so as to close the control valve 6 as soon as possible at the time of the power failure. Therefore, the electrification is carried out directly by the AC power source.

Next, an operation of the protecting apparatus 1 according to this embodiment will be described with reference to FIGS. 1 to 4.

Figure 4:
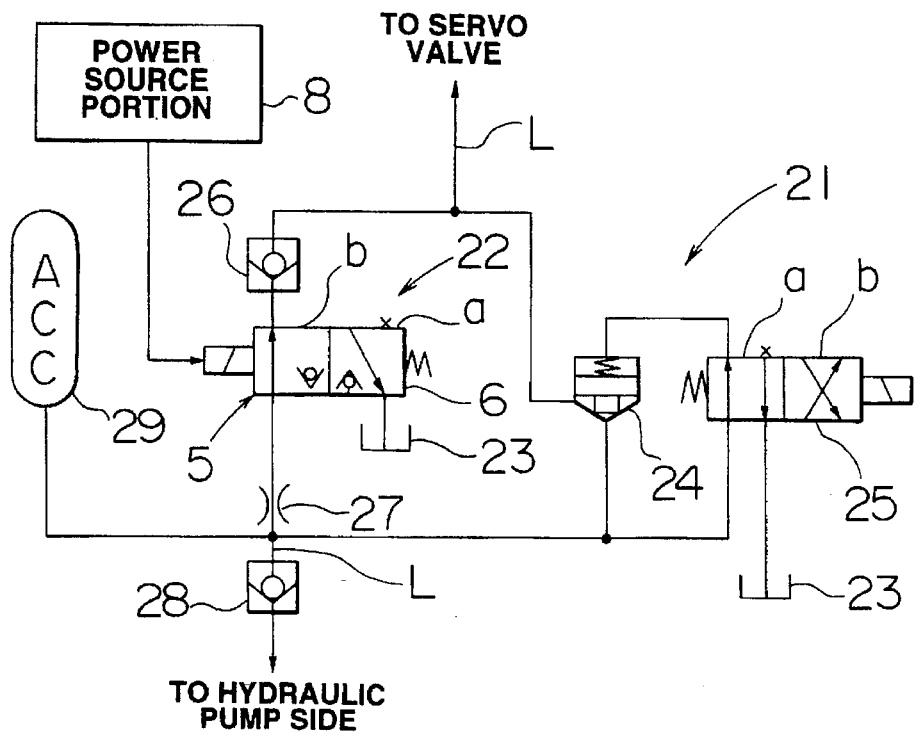
FIG. 4 is a view of a hydraulic circuit in a state where a control valve provided with the same protecting apparatus is changed over.

First, at steps except at the time of a positional control to the screw 9, the control valve 25 is changed over to the position shown by reference symbol b by the control circuit 7, so that the logic valve 24 is in an open state. Also, in the normal state of the non-power failure, the control valve 6 is electrified from the power source 8, so that the control valve 6 is changed over to the position shown by reference symbol b and then the power failure time breaking circuit 5 is electrified, as shown in FIG. 4. Accordingly, the large flow circuit 21 and the small flow circuit 22 permit flow, so that the oil transferring line L is opened. As a result, while the servo valve 4 can be controlled by an instruction signal Sc outputted from the control circuit 7, their is normal control (high speed control) in which the injection cylinder 2i is driven and controlled.

At the time of the positional control to the screw 9, the control valve 25 is changed over to the position shown by reference symbol a by the control circuit 7, so that the logic valve 24 is closed. Thereby, the large flow circuit 21 is in the shut down state, and only the small flow circuit 22 allows flow. Accordingly, since the small flow circuit 22 includes the throttle valve 27, the flow in the oil transferring line L is decreased. Moreover, at the time of the positional control, an oil pressure is applied to both the front oil chamber 2f and the rear oil chamber 2f in the injection cylinder 2i, the positional control (stopping control) is carried out by a pressure balance between both of the chambers 2f and 2r, so that it is enough that the flow is small.

Also, since the power failure detecting circuit Ua does not detect the power failure in the normal state of the non- power failure, the opening/closing switch Ka in the power-failure-time signal outputting circuit Ub is in the open state. Accordingly, the instruction signal input line Lc turns out to be in the non-contact state to the earth line G, so that the instruction signal Sc is applied to the servo valve 4 as it is, from the control circuit 7.

On the other hand, in a case where the power failure is caused at time tp as shown in FIG. 2(A) in the positional controlling state, the power failure is detected by the power failure detecting circuit Ua. Based on which, a neutral signal Sn is applied to the instruction signal input line Lc of the servo valve 4 from the power-failure-time signal outputting circuit Ub. That is, the opening/closing switch Ka is closed, so that a zero potential (neutral signal Sn) shown in FIG. 2(C) is applied to the instruction signal input line Lc. Thereby, the servo valve 4 is fixed to the neutral position, and the problem that the instruction signal Sc becomes unstable due to the occurrence of the power failure can be presented.

Also, by means of the condensers C1, C2 for accumulating the electricity connected between the electric source input lines L1, L2 of the servo valve 4 and the earth line G, even if the power failure occurs, the electric source input lines L1, L2 of the servo valve 4 are applied with the essential electric power input voltage +E, −E, respectively, during a constant time period, as shown in FIG. 2(B), so that the stabilization is realized from the electric power input voltage to the servo valve 4.

Further, since the electrification from the power source 8 to the control valve 6 is stopped, the control valve 6 is changed over to the position shown by reference symbol a as shown in FIG. 3. As a result, the oil transferring line L is shut down by the power-failure-time shutting down circuit 5, and the supply of pressurized oil to the injection cylinder 2i is stopped. On this occasion, since the control valve 6 is electrified from a side of the power source 8, the supply of pressurized oil to the injection cylinder 2i is stopped before the control circuit 7 becomes the non-control state. Therefore, even if the power failure occurs when the purging cover is closed at the time of the positional control, the problem that the resin is ejected at the high speed can be presented. Accordingly, the stabilization is realized of the pressurized oil supply to the servo valve 4.

Incidentally, the flow at the time of the positional control can be decreased by disposing the flow reducing circuit 10 on the oil transferring line L, and the closing speed can be improved at the time when the power failure occurs, and at the time of the positional control.

Figure 5:
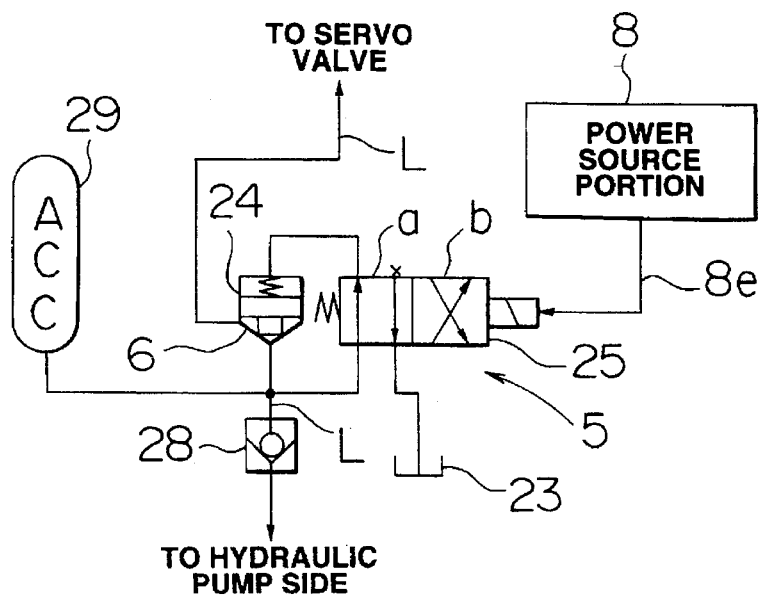
FIG. 5 is a construction at view of a hydraulic circuit provided with a protecting apparatus according to a variant embodiment of the present invention.
Figure 6:
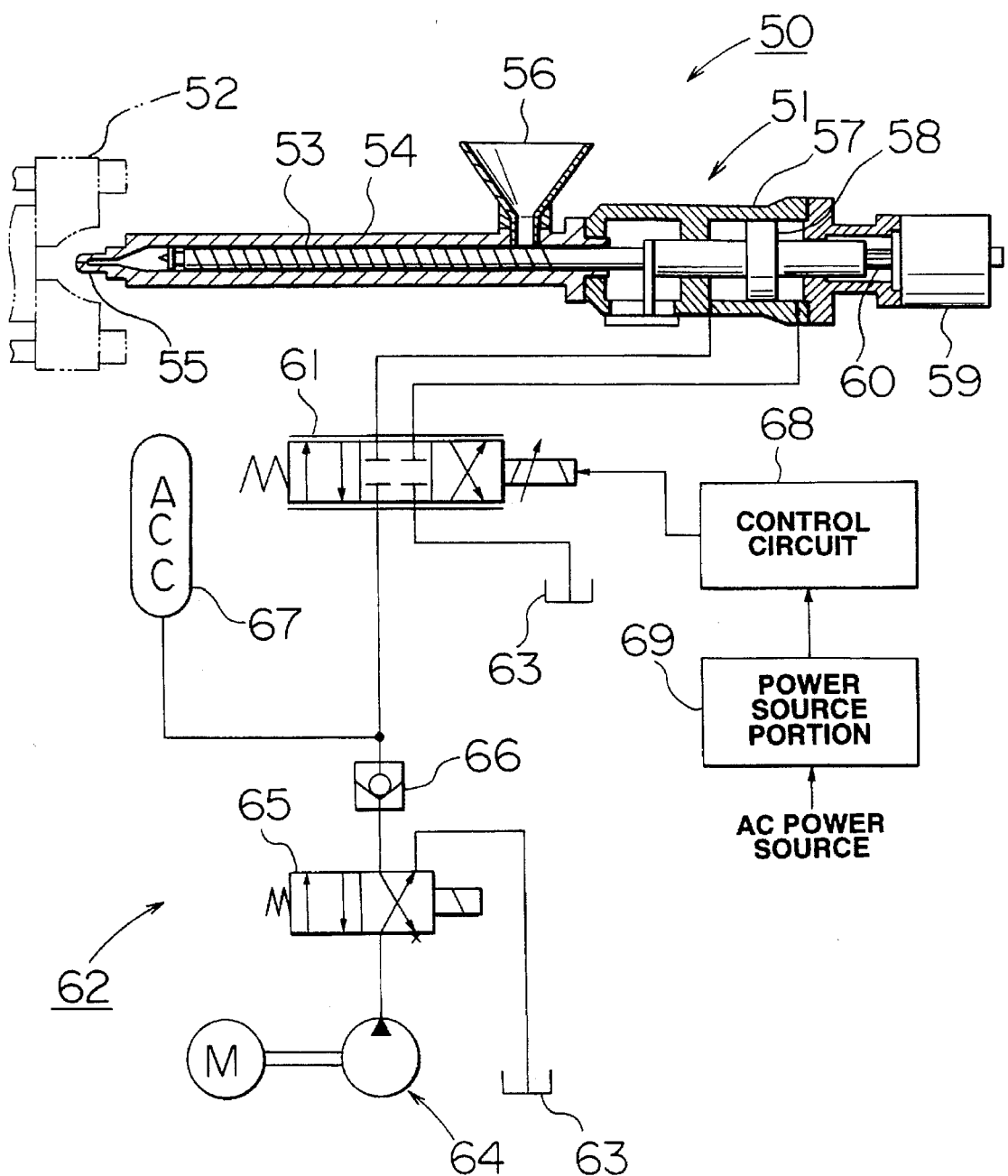
FIG. 6 is a view of an injection molding machine according to a prior technique.

Next, the variant embodiment of the present invention will be described with reference to FIG. 5. Incidentally, in FIG. 5, the same elements as those in FIG. 3 are numbered with the same reference numerals thereof, and the detail description thereof will be omitted.

In the variant embodiment, the small flow circuit 24 is eliminated from the circuit shown in FIG. 3, and the large flow circuit 21 is added with a function as the power-failure-time shutting down circuit 5. Accordingly, in this case, the logic valve 24 constitutes the control valve 6, and the logic valve 24 and the control valve 25 constitute the power-failure-time shutting down circuit 5. Also, an electrifying line 8e of the power source 8 for electrifying the control valve 6, shown in FIG. 3 is used for electrifying the control valve 25. Therefore, at the time of the non-power failure, the control valve 25 is changed over to the position by reference symbol b and the oil transferring line L is opened, and at the time of the power failure, the control valve 25 is changed over to the position shown by reference symbol a and the oil transferring line L is shut, and then the function which is the same as that in FIG. 3 is realized.

Moreover, in the embodiment in FIG. 3, since the flow reducing circuit 10 exists in the oil transferring line L, the flow at the time of the positional control can be decreased, and the closing speed can be improved at the time when the power failure occurs, and at the time of the positional control. However, in the variant embodiment, since the large flow thereof is shut directly by the logic valve 24, the closing speed is decreased compared with the embodiment of FIG. 3.

Although the embodiments are described above in detail, the present invention is not limited to the above mentioned embodiments. For example, the injection cylinder 2i is exemplified as the hydraulic cylinder 2, however, the other hydraulic cylinder can be applied thereto in the same way. Also, the condensers C1, C2 need not be connected to each other, and it is not always necessary to utilize both the large flow circuit 21 and the small flow circuit 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

1. A protecting apparatus of an injection molding machine comprising a hydraulic cylinder having a built-in double rod piston, and a servo valve for driving and controlling the hydraulic cylinder, wherein a power-failure-time shutting down circuit is connected to an oil transferring line for supplying pressurized oil to the hydraulic cylinder, the power-failure-time shutting down circuit having a control valve for opening the oil transferring line at a time of a non-power failure, and shutting down the oil transferring line at a time of a power failure.

2. The protecting apparatus of an injection molding machine according to claim 1, wherein the control valve opens the oil transferring line by electrifying from a power source portion for feeding electricity to a control circuit for controlling the servo valve, and shutting down the oil transferring line by means of stopping electrification.

3. The protecting apparatus of an injection molding machine according to claim 1, wherein the oil transferring line is provided with a flowing amount reducing circuit for reducing a flowing amount of the pressurized oil at a time of positional control of a screw connected to the piston.

4. The protecting apparatus of an injection molding machine according to claim 1, wherein the apparatus comprises a power failure detecting circuit for detecting a power failure, and a power failure time signal outputting circuit for outputting a neutral signal by which the servo valve is controlled at a neutral position, to an instruction signal input line for the servo valve, due to detection of a power failure by the power failure detecting circuit.

5. The protecting apparatus of an injection molding machine according to claim 4, wherein the power failure time signal outputting circuit comprises an opening/closing switch connected between the instruction signal input line and an earth line, which is closed when the power failure is detected by the power failure detecting circuit.

6. The protecting apparatus of an injection molding machine according to claim 4, wherein a condenser for accumulating electricity is connected between a power source input line of the servo valve and an earth line.

7. The protecting apparatus of an injection molding machine according to claim 1, wherein the hydraulic cylinder comprises an injection cylinder.

8. The protecting apparatus of an injection molding machine according to claim 2, wherein the oil transferring line is provided with a flowing amount reducing circuit for reducing a flowing amount of the pressurized oil at a time of positional control of a screw connected to the piston.

9. The protecting apparatus of an injection molding machine according to claim 5, wherein a condenser for accumulating electricity is connected between a power source input line of the servo valve and the earth line.

10. The protecting apparatus of an injection molding machine according to claim 4, wherein the hydraulic cylinder comprises an injection cylinder.

* * * * *